United States Patent [19]

Ebenhoech et al.

[11] Patent Number: 5,362,791
[45] Date of Patent: * Nov. 8, 1994

[54] THERMOPLASTIC COMPOSITIONS FOR PRODUCING METALLIC MOLDINGS

[75] Inventors: Johan Ebenhoech, Ludwigshafen; Dieter Weinand, St. Martin; Wolfgang Kochanek, Neustadt; Martin Bloemacher, Meckenheim, all of Germany

[73] Assignee: BASF Aktiengesellschaft, Ludwigshafen, Germany

[*] Notice: The portion of the term of this patent subsequent to Sep. 8, 2009 has been disclaimed.

[21] Appl. No.: 723,988

[22] Filed: Jul. 1, 1991

[30] Foreign Application Priority Data

Jul. 7, 1990 [DE] Germany .................. 4021739

[51] Int. Cl.⁵ .................................................. C08K 3/08
[52] U.S. Cl. .................................... 524/440; 524/413; 524/430; 524/439; 524/502; 524/522; 524/523; 264/63; 264/328.2; 264/344
[58] Field of Search ............... 524/502, 439, 440, 413, 524/430, 522, 523; 264/63, 328.2, 344

[56] References Cited

U.S. PATENT DOCUMENTS

| | | | |
|---|---|---|---|
| 4,085,087 | 4/1978 | Kratel et al. | 260/42.49 |
| 4,456,713 | 6/1984 | French et al. | 524/455 |
| 4,671,912 | 6/1987 | Komatsu et al. | 264/63 |
| 5,091,346 | 2/1992 | Inoue et al. | 501/93 |
| 5,145,900 | 9/1992 | Sterzel et al. | 524/404 |
| 5,198,489 | 3/1993 | Sterzel et al. | 524/439 |

FOREIGN PATENT DOCUMENTS

| | | |
|---|---|---|
| 0115104 | 9/1987 | European Pat. Off. |
| 0125912 | 9/1987 | European Pat. Off. |
| 0206685 | 3/1989 | European Pat. Off. |
| 0114746 | 4/1989 | European Pat. Off. |
| 0329475 | 8/1989 | European Pat. Off. |
| 0424739 | 5/1991 | European Pat. Off. |

*Primary Examiner*—Paul R. Michl
*Assistant Examiner*—John J. Guarriello
*Attorney, Agent, or Firm*—Keil & Weinkauf

[57] ABSTRACT

Thermoplastic compositions useful for producing metallic moldings contain

A) 40-70% by volume of a sinterable pulverulent metal or of a pulverulent metal alloy or of a mixture thereof, B) 30-60% by volume of a mixture of
  B1) 50-100% by weight of a polyoxymethylene homopolymer or copolymer and
  B2) 0-50% by weight of a polymer which is immiscible with B1) and can be thermally removed without leaving a residue, or a mixture of such polymers,
as binder, and C) 0-5% by volume of a dispersant.

5 Claims, No Drawings

THERMOPLASTIC COMPOSITIONS FOR PRODUCING METALLIC MOLDINGS

The present invention relates to thermoplastic compositions for producing metallic moldings, containing
A) 40–70% by volume of a sinterable pulverulent metal or of a pulverulent metal alloy or of a mixture thereof,
B) 30–60% by volume of a mixture of
  B1) 50–100% by weight of a polyoxymethylene homopolymer or copolymer and
  B2) 0–50% by weight of a polymer which is immiscible with B1) and can be thermally removed without leaving a residue, or a mixture of such polymers,
  as binder, and
C) 0–5% by volume of a dispersant.

The present invention further relates to a process for preparing such compositions. The present invention additionally relates to a method of using such thermoplastic compositions for producing metallic moldings and to the metallic moldings themselves. Finally, the present invention also relates to a process for removing the binder from a preform produced from such a thermoplastic composition.

It is known to produce inorganic moldings by mixing a ceramic or metal powder with a thermoplastic resin, molding the mixture into a green preform, removing the thermoplastic resin and then sintering this preform. According to EP-B-125 912, the preform is machined to its essentially ultimate shape-before being sintered. The thermoplastic resin or binder used is for example polystyrene, polypropylene, polyethylene or an ethylene/vinyl acetate copolymer. These binders are removed from the preform by heating to 300°–5500° C. for 3–8 hours, by thermal cleavage. The temperatures must be raised very carefully and slowly to these levels to avoid damaging the preform through uncontrolled decomposition of the organic substance and the attendant cracking. For this reason the heatup rate should not be more than 4° C./hour. U.S. Pat. No. 4,671,912 recommends even lower heatup rates of 1°–2° C./hour, at least until half the binder has been removed. These long heatup periods of several days do much to make this process economically unattractive.

To shorten the heatup times, EP-B-115 104 recommends using as the binder a mixture of an oxidized paraffin wax or an oxidized microcrystalline wax with a higher fatty acid. EP-B-114 746 describes thermoplastic compositions which contain nonmetallic powders. The process described for removing the binder does not give fully satisfactory results with compositions which contain metal powders or powders of metal alloys.

These processes, which involve the use of thermoplastics or waxes, all have the disadvantage that, to achieve pyrolyric removal of the binder, the preform must be heated to temperatures above the softening point of the binder, so that the risk of deformation is ever present. To avoid such deformation, therefore, it is proposed in U.S. Pat. No. 4,708,838 and in JP-A2-62/12674 that the preform be embedded in a ceramic powder of high thermal stability.

However, it is also known to remove the binder from the preform not by pyrolytic means but by extraction with a solvent. In JP-A2-62/278160 the solvent used is supercritical carbon dioxide at 60° C. and 200 kg/cm$^2$ and in EP-B-206 685 liquid carbon dioxide at from −30° C. to 31.1° C. However, this process requires special pressure apparatus.

German Patent Applications P 39 26 869 and P 40 00 278 describe processes for producing an inorganic sinter by injection or extrusion molding a mixture of a sinterable inorganic powder and polyoxymethylene (as described for example in EP-A-114 746) as binder into a preform, removing the binder, and sintering, wherein the polyoxymethylene is removed by treating the preform in a gaseous acid-containing atmosphere. The acids used in this process are protonic acids, i.e. acids which on reaction with water are split into a proton (hydrated) and an anion, or BF$_3$ or etherares thereof.

However, if pure polyoxymethylene having a low comonomer content is used as binder in the processes of the aforementioned earlier German patent applications in the production of moldings having relatively thick walls, a problem arises due to the high rate of crystallization of the polyoxymethylene. The melt solidifies at the wall of the normally cooled injection mold more rapidly than in the interior; that is, the inside of the molding crystallizes later than the outside. As the process of crystallization is accompanied by a process of volume shrinkage, cracks appear on the inside of the molding, since the already rigidified outer parts can no longer partake in the shrinkage process.

Above-cited EP-A-114 746 proposes the use of a polyoxymethylene copolymer having preferably a comonomer content of from 20 to 80 mol %. Such copolymers have a lower melting point, a lower crystallinity and increased softness and flexibility compared with the corresponding polyoxymethylene homopolymers.

However, another consequence is significantly extended cooling times and increased sticking of the molding in the mold. Owing to the lower melting points of the copolymers, the removal of binder (debindering) must also be carried out at lower temperatures, so that the debindering time required lengthens.

It is an object of the present invention to provide a thermoplastic composition for the production of metallic moldings which does not have the above-described disadvantages and from which crack-free and nonporous metallic moldings can be produced in an economical manner.

We have found that this object is achieved according to the present invention by a thermoplastic composition as claimed in claim 1.

Preferred compositions of this type are revealed in the subclaims.

Component A) of the thermoplastic compositions according to the present invention comprises from 40 to 70, preferably from 45 to 60, % by volume of a pulverulent metal or metal alloy or a mixture thereof.

Examples of metals which can be present in powder form are iron, cobalt and nickel, to mention just a few. Examples of alloys are light metal alloys based on aluminum and titanium and alloys with copper or bronze. Finally, it is also possible to use hard metals such as tungsten carbide, boron carbide or titanium nitride in combination with metals such as cobalt and nickel. The latter can be used in the manufacture of cermet cutting tool tips.

A proportion of component A), preferably not more than 50% by weight, in particular from 5 to 20% by weight, based on component A), may be replaced by inorganic fibers or whiskers, for example of Al$_2$O$_3$, SiC or Si$_3$N$_4$.

Component B) of the thermoplastic compositions according to the present invention comprises from 35 to 60, preferably from 40 to 55, % by volume of a mixture of B1) from 50 to 100, preferably from 80 to 98, in particular from 85 to 98, % by weight, based on B), of a polyoxymethylene homopolymer or copolymer and B2) from 0 to 50, preferably from 2 to 20, in particular from 2 to 15, % by weight of a polymer which is immiscible with B1) and can be thermally removed without leaving a residue, or a mixture of such polymers, as binder.

Polyoxymethylene homopolymers and copolymers are known per se to the skilled worker and are described in the literature.

The homopolymers are in general prepared by polymerizing formaldehyde or trioxane, preferably in the presence of suitable catalysts.

Polyoxymethylene copolymers which are preferred for the purposes of the present invention, besides the repeat unit $-OCH_2-$, contain up to 50, preferably 0.1–20, in particular 0.3–10, mol % of repeat units

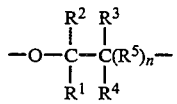

where each of $R^1$ to $R^4$ is independently of the others hydrogen, $C_1$-$C_4$-alkyl or haloalkyl of 1–4 carbon atoms, $R^5$ is $-CH_2-$, $-CH_2O-$, $C_1$-$C_4$-alkyl- or $C_1$-$C_4$-haloalkyl-substituted methylene or similar oxymethylene, and n is 0–3. Advantageously, these groups can be introduced into the copolymers by ring opening of cyclic ethers. Preferred cyclic ethers are those of the formula

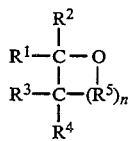

where $R^1$–$R^5$ and n are each as defined above. Examples of cyclic ethers are ethylene oxide, 1,2-propylene oxide, 1,2-butylene oxide, 1,3-butylene oxide, 1,3-dioxane, 1,3-dioxolane and dioxepane, and examples of comonomers are linear oligo- or polyformals such as polydioxolane and polydioxepane.

Suitable components B1 also include oxymethylene terpolymers prepared for example by reacting trioxane, one of the above-described cyclic ethers and a third monomer, preferably a bifunctional compound of the formula

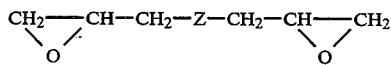

where Z is a chemical bond, $-O-$ or $-ORO-$ ($R = C_1$-$C_8$-alkylene or $C_3$-$C_8$-cycloalkylene).

Preferred monomers of this kind are ethylene diglycide, diglycidyl ethers and diethers of glycidyls and formaldehyde, dioxane or trioxane in a molar ratio of 2:1 and also diethers of 2 mol of glycidyl compound and 1 mol of an aliphatic diol of 2-8 carbon atoms, for example the diglycidyl ethers of ethylene glycol, 1,4-butanediol, 1,3-butanediol, 1,3-cyclobutanediol, 1,2-propanediol and 1,4-cyclohexanediol, to name but a few.

Processes for preparing the above-described homopolymers and copolymers are known to the person skilled in the art and are described in the literature, so that no further details are required.

The preferred polyoxymethylene homopolymers and copolymers have melting points of at least 150° C. and weight average molecular weights within the range from 5000 to 150,000, preferably from 7000 to 60,000.

A suitable component B2) is basically any polymer which is not miscible with the polyoxymethylene homopolymer or copolymer B1).

Preferred polymers of this kind are polyolefins, aromatic vinyl polymers, polymers of vinyl esters of aliphatic $C_1$-$C_8$-carboxylic acids, polymers of vinyl alkyl ethers having from 1 to 8 carbon atoms in the alkyl group, and polymers of methacrylic esters containing at least 70% by weight of units derived from methacrylic esters, and also mixtures thereof.

Suitable polyolefins are those of from 2 to 8 carbon atoms, in particular from 2 to 4 carbon atoms, and also the copolymers thereof. Particular preference is given to polyethylene, polypropylene and copolymers thereof, such as are known to the person skilled in the art and commercially available, for example from BASF AG under the tradenames Lupolen ® and Novolen ®. Examples of aromatic vinyl polymers are polystyrene and poly-α-methylstyrene and copolymers thereof with up to 30% by weight of comonomers selected from the group consisting of the acrylic esters, acrylonitrile and methacrylonitrile. Again such polymers are commercially available, so that no further details are required.

Examples of polymers of vinyl esters of aliphatic carboxylic acids of from 1 to 8 carbon atoms are polyvinyl acetate and polyvinyl propionate, and examples of polymers of vinyl alkyl ethers are polyvinyl methyl ether and polyvinyl ethyl ether.

The last group of suitable polymers B2) are polymers of methacrylic esters containing 70–100% by weight of units derived from monomers of the formula I

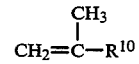

where $R^{10}$ is a radical of the formula

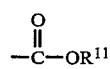

in which $R^{11}$ is alkyl of from 1–14 carbon atoms, in particular $-CH_3-$ or $-C_2H_5-$.

If a comonomer is present, it comprises advantageously from 0 to 30, preferably from 0 to 20, % by weight of an acrylic ester, in particular ethyl acrylate or methyl acrylate.

Such polymers of monomers of the formula I with or without further monomers, preferably acrylic esters, can be prepared in a conventional, preferably a freeradical, polymerization, for example an emulsion or bead, solution or bulk polymerization (cf. Kirk-Othmer, Encyclopedia of Chemical Technology 3rd Ed., Vol. 1., pp. 330–342, Vol. 18, pp. 720–755, J. Wiley; H. Rauch- Puntigam, Th. Völker, Acryl- und Methacrylverbindungen). Possible initiators, depending on the monomers and the type of polymerization, are free radical initiators such as peroxy or peroxo compounds and azo compounds, the amount of initiator being in general within the range from 0.001 to 0.5% by weight, based on the monomers.

Suitable initiators for an emulsion polymerization are for example peroxodisulfates and redox systems, for a bulk polymerization not only peroxides such as dibenzoyl peroxide or dilauroyl peroxide but also azo compounds, for example azobisisobutyrodinitrile, similarly in the case of the solution or bead polymerization. The molecular weight may be regulated using conventional regulators, in particular mercaptans, e.g. dodecylmercaptan.

Preferably, the polymerization is carried out at elevated temperature, for example above 50° C. The weight average molecular weight is in general within the range from 2000 to 5,000,000, preferably from 20,000 to 3,000,000 (determination by light scattering; cf. HoubenWeyl, Methoden der Org. Chemie, 4th edition, Volume 14/1, Georg Thieme-Verlag Stuttgart 1961).

Component C) of the thermoplastic compositions according to the present invention may comprise from 0 to 5, preferably from 1 to 5, % by volume of a dispersant. Examples are oligomeric polyethylene oxide having an average molecular weight of 200-600, stearic acid, stearamide, hydroxystearic acid, fatty alcohols, fatty alcohol sulfonates and block copolymers of ethylene oxide and propylene oxide.

Additionally, the thermoplastic compositions may contain customary additives and processing aids which have a favorable influence on the rheological properties of the mixtures at the molding stage.

The thermoplastic compositions according to the present invention are prepared in the process according to the present invention by melting component B), preferably in a twin-screw extruder, at preferably 150°-220° C., in particular 170°-200° C. Component A) is then metered in the required amount into the melt stream of component B) at temperatures within the same range. Advantageously, component A) contains the dispersant(s) C) at the surface.

A particularly preferred apparatus for metering in component A) contains as an essential element a conveyor screw which is situated within a heatable metal cylinder and which conveys component A) into the melt of component B).

The above-described process has the advantage over mixing the components at room temperature and then extruding them at elevated temperature that any decomposition of the polyoxymethylene binder as a consequence of the high shear forces arising in this version of the process is substantially avoided.

If molding is to take the form of injection molding, the customary screw and piston injection machines can be used. This generally takes place at 175°-200° C. and 3000-20,000 kPa into molds maintained at 60°-120° C.

Extrusion molding into pipes, rods and profiles preferably takes place at 170°-200° C.

To remove the binder, the preforms are preferably first treated with a gaseous acid-containing atmosphere in line with the earlier German Patent Applications P 39 29 860 and P 40 00 278.

This treatment takes place in the process according to the present invention at 20°-180° C. in the course of 0.1-24 h, preferably 0.5-12 h.

Suitable acids for the treatment in this first stage of the process according to the present invention are inorganic acids which are already gaseous at room temperature or at least vaporizable at the treatment temperature. Examples are halohydric acids and $HNO_3$. Suitable organic acids are those which have a boiling point of less than 130° C. under atmospheric pressure, for example formic acid, acetic acid, trifluoroacetic acid or mixtures thereof.

Other suitable acids are $BF_3$ and adducts thereof with organic ethers. In general, the required treatment time depends on the treatment temperature and the concentration of the acid in the treatment atmosphere.

If a carrier gas is used, it is generally passed beforehand through the acid to become laden therewith. The so laden carrier gas is then brought to the treatment temperature, which advantageously is higher than the lading temperature to avoid condensation of the acid.

Preferably, the acid is mixed into the carrier gas via a metering means and the mixture is heated up to such an extent that it is no longer possible for the acid to condense.

The treatment in the first stage is carried on until the polyoxymethylene content B1) of the binder has been removed to a degree of at least 80%, preferably at least 90% by weight. This is easily discernible from the decrease in weight. The products so obtained are then heated to 250°-500° C., preferably 350°-450° C., for 0.1-12 h, preferably 0.3-6 h, in order to remove in full any residue of binder still present.

The product so freed of binder can then be converted into a metallic molding in a conventional manner by sintering.

The thermoplastic compositions according to the present invention have the advantage that the preforms or metallic moldings produced therefrom are free of cracks and pores even when they have thick walls.

It must be considered an additional advantage that the removal of the binder takes place in two stages in principle. First, the polymer B1) is removed at relatively low temperatures by hydrolyric degradation, leaving the bulk of polymer B2) behind. The products obtained at that stage are relatively stable and can be freely handled or transported. The remainder of polymer B2) is then preferably removed thermally at 250°-500° C.

EXAMPLE 1

A twin-screw extruder having a screw diameter of 30 mm was charged with 5.0 kg/h of a polyoxymethylene containing 2.5% by weight of butanediol formal as comonomer and 0.6 kg/h of a commodity polyethylene of low density (density=0.917 g/ml), an MFI 190/2.16=20 g/10 min (determined in accordance with German Standard Specification DIN 53 735) and a low melt viscosity. The material was melted at 180° C., and the screw speed was 70 rpm.

An extruder flanged laterally to the first extruder and equipped with a conveyor spiral for powder was charged with 45 kg/h of an iron powder containing 0.25% by weight of a polyethylene oxide of molecular weight 400 as dispersant, and the contents were heated to 170° C. by the end of the conveyor screw.

At the end of the conveying section the metal powder was mixed with the melt stream, and the mixture was sheared, homogenized and extruded through dies in strand form. The strands were cooled in an air stream and granulated. The granules thus obtained contained 57% by volume of iron powder.

The granules were melted in the cylinder of a screw type injection molding machine at 180° C. and injected into a mold having a wall temperature of 120° C. to produce disks 80 mm in diameter and 4 mm in thickness. The X-rays of these disks showed neither cracks nor pores.

The subsequent debindering was carried out in a virtually tight drying cabinet 50 l in capacity. The atmosphere was vigorously recirculated within the drying cabinet using a ventilator in order to achieve a constant temperature within the entire cabinet and efficient heat transfer to the structure to be debindered.

The drying cabinet was equipped with one of the disks to be debindered, to be precise the disk was suspended from a wire passing upward through the housing and connected to a balance to permit continuous measurement of the weight loss. Then the cabinet was purged for 20 minutes with a nitrogen stream of 400 l/h in order to displace the air down to an $O_2$ content of less than 2%. At the same, time the atmosphere in the drying cabinet was heated to 120° C. The debindering was started with the addition of 25 g/h of 100% strength nitric acid to the 400 l/h nitrogen stream, so that the concentration of the nitric acid in the metered gas stream was about 2% by volume.

Given that the starting weight of the disk was 102.0 g, the iron content of 88.7% by weight corresponded to 90.5 g, and the 11.3% by weight of binder and dispersant corresponded to 11.5 g. The polyoxymethylene was 9.9% by weight, corresponding to 10.1 g. The following table shows the weight decrease as a function of time:

| Time (min) | Weight decrease (g) | Degree of debindering (%) |
| --- | --- | --- |
| 0 | 0 | 0 |
| 10 | 2.85 | 24.8 |
| 20 | 4.75 | 41.3 |
| 30 | 6.16 | 53.6 |
| 40 | 7.21 | 62.7 |
| 50 | 8.29 | 72.1 |
| 60 | 9.40 | 81.7 |
| 70 | 10.26 | 89.2 |
| 80 | 10.26 | 89.2 |

The weight loss after 80 minutes at 120° C. was approximately equal to the proportion of polyoxymethylene copolymer in the binder.

The disk was then heated up in a chamber oven at 40° C./min to 400° C. and left at that temperature for 1 hour. In the course of this heating the weight decreased by a further 1.24 g, corresponding to a degree of debindering of 100%. The disk was free of dimensional changes and cracks.

EXAMPLE 2

A twin-screw extruder having a screw diameter of 60 mm was charged with 5.0 kg/h of polyoxymethylene containing 2.5% by weight of butanediol formal as comonomer and 0.5 kg/h of a highly isotactic polypropylene homopolymer (density=0.908 g/ml; MFI 230/2.16=12 g/10 min, determined in accordance with German Standard Specification DIN 53 735). The material was melted at 180° C., and the screw speed was 70 rpm.

An extruder flanged laterally to the first extruder and equipped with a conveyor spiral for powder was charged with 11.6 kg/h of silicon powder having an average particle diameter of 5 $\mu$m and containing 1.0% by weight of polyethylene oxide of molecular weight 400 as dispersant, and the contents were heated to 170° C. by the end of the conveyor screw.

At the end of the conveying section the metal powder was mixed with the melt stream, and the mixture was sheared, homogenized and extruded through dies in strand form. The strands were cooled down in an air stream and granulated. The granules thus obtained contained 54% by volume of silicon powder.

The granules were melted in the cylinder of a screw type injection molding machine at 180° C. and injected into a mold having a wall temperature of 120° C. to produce disks 80 mm in diameter and 4 mm in thickness.

The subsequent debindering was carried out in a virtually tight drying cabinet 50 l in capacity. The atmosphere within the drying cabinet was vigorously recirculated by means of a ventilator in order to achieve a constant temperature within the entire cabinet and efficient heat transfer to the structure to be debindered.

The drying cabinet was equipped with one of the disks to be debindered, to be precise the disk was suspended from a wire leading upward through the housing and connected to a balance in order to permit continuous measurement of the weight loss. The cabinet was then purged with a nitrogen stream of 400 l/h for 20 minutes in order to displace the air down to an $O_2$ content of less than 2%. At the same time, the atmosphere in the drying cabinet was heated to 150° C. The debindering was started with the addition of 10 l/h of $BF_3$ to the 400 l/h nitrogen stream, so that the concentration of $BF_3$ in the metered gas stream was 2.5% by volume.

Given a starting weight of the disk of 37.5 g, the silicon content of 67.4% by weight corresponded to 25.3 g, the 32.6% by weight of binder and dispersant corresponded to 12.2 g, and the 29.0% by weight of polyoxymethylene corresponded to 10.9 g. The following table shows the weight decrease as a function of time:

| Time (min) | Weight decrease (g) | Degree of debindering (%) |
| --- | --- | --- |
| 0 | 0 | 0 |
| 5 | 3.36 | 27.5 |
| 10 | 5.28 | 43.0 |
| 15 | 6.79 | 55.7 |
| 20 | 7.98 | 65.4 |
| 25 | 9.11 | 74.6 |
| 30 | 10.18 | 83.4 |
| 35 | 11.15 | 91.4 |
| 40 | 11.15 | 91.4 |

Again the weight decrease corresponded approximately to the proportion of polyoxymethylene copolymer B1) in the binder.

Thereafter the disk was heated up in a chamber oven at 40° C./min to 400° C. and left at that temperature for 1 h. In the course of this period the weight decreased by a further 1.05 g, corresponding to a degree of debindering of 100%. The disk was free of dimensional changes and cracks.

We claim:
1. A thermoplastic composition for producing a metallic molding, containing

A) 40–70% by volume of a sinterable pulverulent metal or of a pulverulent metal alloy or of a mixture thereof,
B) 30–60% by volume of a mixture of
   B1) 50–100% by weight of a polyoxymethylene homopolymer or copolymer and
   B2) 2–20% by weight of a polymer which is immiscible with B1) and can be thermally removed without leaving a residue, or a mixture of such polymers,
   as binder, and
C) 0–5% by volume of a dispersant.

2. A thermoplastic composition as claimed in claim 1, wherein component B2) is a polyolefin, an aromatic vinyl polymer, a polymer of a vinyl ester of an aliphatic $C_1$–$C_8$-carboxylic acid, a polymer of a vinyl alkyl ether having from 1 to 8 carbon atoms in the alkyl group, or a polymer of a methacrylic ester containing at least 70% by weight of units derived from methacrylic esters, or a mixture thereof.

3. A metallic molding produced from a thermoplastic composition as claimed in claim 1.

4. A process for preparing a thermoplastic composition containing as essential components A) 40–70% by volume of a sinterable pulverulent metal or of a pulverulent metal alloy or of a mixture thereof,
B) 30–60% by volume of a mixture of
   B1) 50–100% by weight of a polyoxymethylene homopolymer or copolymer and
   B2) 0–50% by weight of a polymer which is immiscible with B1) and can be thermally removed without leaving a residue, or of a mixture of such polymers,
   as binder, and
C) 0–5% by volume of a dispersant, which comprises
   a) melting component B) at 150°–220° C. and then
   b) metering component A) into the melt stream of component B) with or without C) at a temperature within the same range as in step a).

5. A process for removing the binder from a preform produced from a thermoplastic composition as claimed or used in claim 1, which comprises
   a) producing a preform from the thermoplastic composition by injection or extrusion molding,
   b) treating the resulting preform at from 20° to 180° C. with a gaseous acid-containing atmosphere for 0.1–24 h, and
   c) then heating it at 250°–500° C. for 0.1–12 h.

* * * * *